(12) United States Patent
Chiu

(10) Patent No.: US 7,724,381 B2
(45) Date of Patent: May 25, 2010

(54) OPTICAL LOCATING DEVICE

(75) Inventor: Wen-Ssu Chiu, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1045 days.

(21) Appl. No.: 11/434,359

(22) Filed: May 15, 2006

(65) Prior Publication Data

US 2007/0086083 A1 Apr. 19, 2007

(30) Foreign Application Priority Data

Oct. 14, 2005 (CN) .......................... 2005 1 0100358

(51) Int. Cl.
*G01B 11/14* (2006.01)

(52) U.S. Cl. ...................................... 356/614; 356/622

(58) Field of Classification Search ......... 356/614–624, 356/482, 498, 152.3; 250/221, 231.13, 206.1, 250/208.6, 231.18, 559.32, 559.29, 559.3; 180/168–169; 246/122 R, 167 R; 340/988–989
See application file for complete search history.

(56) References Cited

U.S. PATENT DOCUMENTS 7,199,883 B1 * 4/2007 Schaad ....................... 356/614

* cited by examiner

*Primary Examiner*—Gregory J Toatley, Jr.
*Assistant Examiner*—Tri T Ton
(74) *Attorney, Agent, or Firm*—Jeffrey T. Knapp

(57) ABSTRACT

An optical locating device (100) for identifying position includes a light emitter (101), a reflector (20), and a light receiver (30). The light emitter is disposed on a moving member (10) for emitting light. The reflector is configured for reflecting the light. The light receiver has at least one linear image sensor (301) for receiving the light reflected by the reflector and thereby generating an image signal corresponding to the light, and a processor (302) connecting to the image sensor to process the image signal for identifying the position of the moving member.

14 Claims, 1 Drawing Sheet

OPTICAL LOCATING DEVICE

TECHNICAL FIELD

The present invention generally relates to an optical locating device and, more particularly, to an optical locating device for use in precision machines.

BACKGROUND

Locating devices used in precision machines typically have two kinds: static locating devices and dynamic locating devices.

A typical static locating device generally includes a photoelectric switch or a limit switch for locating position of the precision machine. The precision machine has a movable stage. When the movable stage touches the photoelectric switch or the limit switch, the required position of the precision machine is located. However, this kind of static locating device cannot be used for real time controlling, thus it cannot be used for locating a plurality of positions.

The dynamic locating device has an optical linear scale and a servo controller such as a computerized numerical control (CNC) device. When combined with the servo controller, a position sensor can locate the position of the precision machine. The optical linear scale is a linear optical encoders which is made according to the optical diffraction theory. A typical optical linear scale includes a main scale, an index scale, a photoelectric conversion part, and an absolute interpolation means. The main scale is provided with a first cut line showing at least an original position and a second cut line graduated longitudinally at equal intervals. The index scale is provided with a cut line across said first and second cut lines, which is placed so as to be movable relative to said main scale. The photoelectric conversion part is for detecting Moire fringes generated by the cut lines between said two scales and for generating a signal having sinusoidal waveform and an original detecting signal showing a range of the above-mentioned original positions. The signal having sinusoidal waveform changes by one period every relative movement by unit length. The absolute interpolation means is used for outputting an inside value of the above-mentioned unit length by generating a pulse signal according to a prescribed phase deviation of the above-mentioned signal having sinusoidal waveform. An original position signal is generated by a logical product of an interpolated count value showing specific interpolation position information outputted from the above-mentioned absolute interpolation means and the origin detecting signal showing the above-mentioned origin position. When the optical linear scale is used for locating position of a precision machine, it must be disposed on the precision machine, thus, the optical linear scale is prone to be contaminated by a cutting liquid or even be damaged by an mishap in manufacture. Thus, the locating accuracy for the precision machine is decreased.

What is needed, therefore, an optical locating device for use in a precision machine which can be used for real time control, and can achieve high locating accuracy.

SUMMARY OF THE INVENTION

In one preferred embodiment, an optical locating device for identifying position includes a light emitter, a reflector, and a light receiver. The light emitter is disposed on a moving member for emitting light. The reflector is configured for reflecting the light. The light receiver has at least one linear image sensor for receiving the light reflected by the reflector and thereby generating an image signal corresponding to the light, and a processor connecting to the image sensor to process the image signal for identifying the position of the moving member.

Other advantages and novel features of a preferred embodiment of the present optical locating device and its applications will become more apparent from the following detailed description when taken in conjunction with the accompanying drawings.

BRIEF DESCRIPTION OF THE DRAWINGS

Many aspects of the optical locating device and their applications can be better understood with reference to the following drawings. The components in the drawings are not necessarily drawn to scale, the emphasis instead being placed upon clearly illustrating the principles of the optical locating device. Moreover, in the drawings, like reference numerals designate corresponding parts throughout the several views.

DETAILED DESCRIPTION OF PREFERRED EMBODIMENTS

Figure 1:
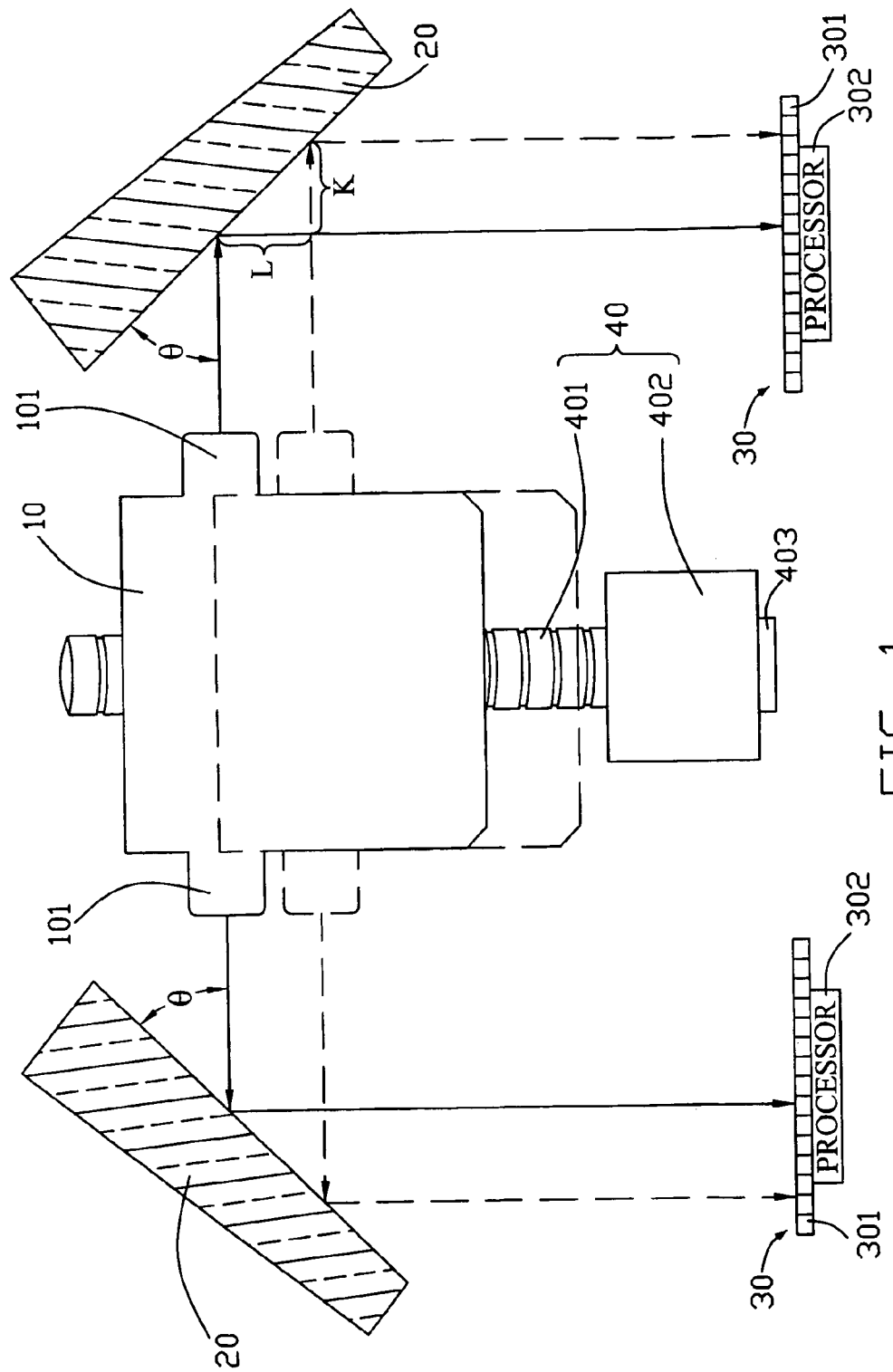
FIG. 1 is a schematic view of an optical locating device for locating position in accordance with a preferred embodiment of the present invention.

Referring to FIG. 1, in a preferred embodiment, an optical locating device 100 for locating position includes a light emitter 101 disposed on a mechanical stage 10, a reflector 20, a light receiver 30, and a driving element 40.

The mechanical stage 10 is one part of a precision machine (not shown). The mechanical stage 10 is a substantially square stage. An engaging structure (not shown) is disposed below the mechanical stage 10. The light emitter 101 includes two light sources disposed with one at either of two sides of the mechanical stage 10. The light emitter 101 can emit a collimated light such as a laser beam. In this preferred embodiment, the collimated light is emitted horizontally from the two light sources.

The reflector 20 includes two plane mirrors disposed adjacent to the mechanical stage 10 for reflecting the light emitted from the light emitter 101. Each plane mirror has a gradient angle θ corresponding to the mechanical stage 10. In this preferred embodiment, the gradient angle θ is 45 degrees.

The light receiver 30 has two linear image sensors 301 disposed adjacent to one end of the mechanical stage 10 and two processors 302 connecting the image sensors 301. Each linear image sensor 301 is a linear charge coupled device (CCD). The two linear image sensors 301 are configured for receiving the light reflected by the reflector 20.

The driving element 40 includes a screw structure 401, a motor 402, and a controller 403. One end of the screw structure 401 engages with the engaging structure of the stage 10 and the other end of the screw structure 401 is connected to the motor 402. The controller 403 is connected with the motor 402 and the processor 302.

In use, the light emitter 101 emits a collimated light to the reflector 20. The reflector 20 reflects the light to the light receiver 30. Then, the image sensors 301 of the light receiver 30 receive the light reflected by the reflector 20, and send a position signal of the mechanical stage 10 to the processor 302. By identifying the signal, the processor 302 can identify the position of the mechanical stage 10. For example, a moving length of the mechanical stage 10 is L, and a moving length of the light along the linear charge coupled device is K, because the gradient angle θ of the reflector is 45 degrees and the collimated light are emitted horizontally, thus, K=L, namely, the moving length of the light along the linear charge coupled device is equal to the moving length of the mechanical stage. If the gradient angle θ of the reflector 20 is not 45 degrees, the relation between the moving length of the mechanical stage and the moving length of the light along the linear charge coupled device will be a trigonometric function. By changing the gradient angle θ of the reflector 20, the length K can be enlarged or reduced according to the length L so as to satisfy different requirements. After the processor 302 identifies the position of the mechanical stage 10, if the mechanical stage 10 is still not moved to a required position, the processor 302 will send a moving signal to the controller 403 of the driving element 40. Combining with the screw structure 401, the motor 402 drives the stage 10 to move according to the moving signal. If the mechanical stage 10 is moved to a required position, the motor 402 stops driving.

The optical locating device 100 locates position of a precision machine by the reflector 20 and the light receiver 30. Because the reflector 20 and the light receiver 30 are not disposed on the precision machine, the reflector 20 and the light receiver 30 cannot be contaminated by a cutting liquid or be damaged by a manufacturing mishap. Therefore, the optical locating device 100 can achieve real time control, and can locate objects with accuracy.

In the alternative embodiment, the two linear image sensors 301 disposed adjacent to one end of the mechanical stage 10 are replaced by one linear charge coupled device. The mechanical stage 10 can be of a shape other than square. The linear image sensor can also be a complementary metal-oxide semiconductor (CMOS).

It is believed that the embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

I claim:

1. An optical locating device for identifying positions of a moving member, comprising:
   a light emitter configured so as to be disposed on the moving member for emitting light;
   a reflector for reflecting the light;
   a light receiver having at least one linear image sensor for receiving the light reflected by the reflector and thereby generating an image signal corresponding to the light, and a processor connecting to the image sensor to process the image signal for identifying the position of the moving members;
   wherein the moving member is a mechanical stage;
   wherein the reflector comprises two plane mirrors disposed adjacent to the mechanical stage for reflecting the light emitted from the light emitter and each plane mirror has a gradient angle corresponding to the mechanical stage.

2. The optical locating device as claimed in claim 1, wherein the light emitting from the light emitter is collimated light.

3. The optical locating device as claimed in claim 1, wherein the gradient angle is 45 degrees.

4. The optical locating device as claimed in claim 1, wherein the light receiver has two linear image sensors disposed adjacent to one end of the mechanical stage.

5. The optical locating device as claimed in claim 4, wherein each of the linear image sensor is a linear charge coupled device.

6. The optical locating device as claimed in claim 4, wherein the linear image sensor is a complementary metal-oxide semiconductor.

7. The optical locating device as claimed in claim 4, wherein the optical locating device has a driving element for driving the mechanical stage.

8. The optical locating device as claimed in claim 7, wherein the driving element includes a screw structure, a motor disposed at one end of the screw structure, and a controller connecting with the processor of the light receiver for controlling the motor.

9. The optical locating device as claimed in claim 8, wherein an engaging structure is disposed below the mechanical stage for engaging with the screw structure.

10. A locating device for identifying position of a moving member, the locating device comprising:
    a light emitter configured so as to be disposed on the moving member for emitting a light;
    a reflector configured for reflecting the light; and
    a light receiver including an image sensor configured for receiving the light, wherein as the moving member moves, the image sensor generates distinct image signal in response to the light, whereby the location of the moving member is detected by identifying the image signals;
    wherein the reflector is two plane mirrors disposed adjacent to the mechanical stage for reflecting the light emitted from the light emitter and each plane mirror has a gradient angle corresponding to the moving member.

11. The locating device as claimed in claim 10, wherein the locating device for identifying position has a processor connecting to the image sensor.

12. The locating device as claimed in claim 11, wherein the image sensor is one of a linear charge coupled device and a linear complementary metal-oxide semiconductor.

13. The locating device as claimed in claim 11, wherein the optical locating device has a driving element for driving the mechanical stage.

14. The locating device as claimed in claim 13, the driving element includes a screw structure, a motor disposed at one end of the screw structure, and a controller connecting with the processor of the light receiver for controlling the motor.

* * * * *